(12) United States Patent
Hamada (10) Patent No.: US 6,272,574 B1
(45) Date of Patent: Aug. 7, 2001

(54) DEVICE SUCH AS EXPANSION CARD, ACCESS CONTROL METHOD OF THE EXPANSION CARD, AND A MEMORY MEDIUM STORING A PROGRAM CAPABLE OF BEING READ BY COMPUTER

(75) Inventor: Hiroshi Hamada, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/032,783

(22) Filed: Mar. 2, 1998

(30) Foreign Application Priority Data

Mar. 6, 1997 (JP) .................................................. 9-051526

(51) Int. Cl.⁷ .................................................. G06F 13/00
(52) U.S. Cl. .............................. 710/102; 713/400; 710/62
(58) Field of Search ............................ 710/8–14, 62–74, 710/102, 101; 713/400

(56) References Cited

U.S. PATENT DOCUMENTS

| | | | |
|---|---|---|---|
| 5,566,325 | * 10/1996 | Bruce, II et al. | ..................... 711/167 |
| 5,625,847 | * 4/1997 | Ando et al. | ............................. 710/60 |
| 5,631,931 | * 5/1997 | Takano et al. | ........................ 375/347 |
| 5,649,124 | * 7/1997 | Kreidl | ................................. 710/126 |
| 5,696,949 | * 12/1997 | Young | ................................. 713/400 |
| 5,717,948 | * 2/1998 | Michalina | ................................ 710/1 |
| 5,761,479 | * 6/1998 | Huang et al. | ........................ 710/102 |
| 5,812,762 | * 9/1998 | Kim | ..................................... 713/200 |
| 5,819,116 | * 10/1998 | Maupin et al. | ......................... 710/68 |
| 5,954,821 | * 9/1999 | Young | ................................. 713/400 |
| 6,000,037 | * 12/1999 | Herbert | ................................ 713/400 |
| 6,032,261 | * 2/2000 | Hulyalkar | ............................ 713/400 |

\* cited by examiner

Primary Examiner—David A. Wiley
(74) Attorney, Agent, or Firm—Fitzpatrick, Cella, Harper & Scinto (57) ABSTRACT

A data process of high performance is realized while generating a reference clock of a predetermined frequency without being influenced by a frequency fluctuation of a data transmission clock which is supplied through an expansion bus. A micro-computer measures the frequency of the data transmission clock and sets a frequency of the reference clock which is generated by a PLL circuit on the basis of the measured frequency.

8 Claims, 6 Drawing Sheets

- DATA TRANSMISSION CLOCK (a)
- OPERATION CLOCK (b)
- RAS (c)
- CAS (d)

FIG. 4

| | | | | | | | | | | (MHz) |
|---|---|---|---|---|---|---|---|---|---|---|
| CLOCK a | 66-60 | 60-50 | 50-40 | 40-33 | 33-30 | 30-25 | 25-20 | 20-16.6 | 16.6-10 | 10- |
| CLOCK b | 33-30 | 33-28 | 33-27 | 33-28 | 33-30 | 33-28 | 33-27 | 33-28 | 33-20 | 33- (MHz) |
| FREQUENCY DIVISION RATIO M | 2 | 9 | 3 | 6 | 1 | 9 | 3 | 3 | 1 | 3 |
| FREQUENCY DIVISION RATIO N | 1 | 5 | 2 | 5 | 1 | 10 | 4 | 5 | 2 | 10 |

| DIRECTORY INFORMATION |
|---|
| 1ST DATA PROCESSING PROGRAM PROGRAM CODES FOR STEPS OF FLOWCHART SHOWN IN FIG.5 |
| |

MEM MAP OF MEMORY MEDIUM

DEVICE SUCH AS EXPANSION CARD, ACCESS CONTROL METHOD OF THE EXPANSION CARD, AND A MEMORY MEDIUM STORING A PROGRAM CAPABLE OF BEING READ BY COMPUTER

BACKGROUND OF THE INVENTION

1. Field of the Invention

The invention relates to an expansion card which is connected to a predetermined bus of a computer apparatus and executes a predetermined expanding function process synchronously with a clock which is supplied, an access control method for use with the expansion card, and a memory medium in which a program that can be read out by a computer has been stored.

2. Related Background Art

Hitherto, an expansion bus to expand a function is provided for a computer such as a personal computer or the like. A card which is attached to the expansion bus is called an expansion card.

Such an expansion card transmits and receives data to/from a computer main body via signal lines (mainly an address/data line, a control signal line, and the like) on the expansion bus, thereby providing an expanding function to the computer.

As a data transmission system using the expansion bus, there are an asynchronous data transmission system and a synchronous data transmission system. The asynchronous transmission system is a system in which data is transmitted by a hand-shake by using a control signal without using a common clock signal at the time of the data transmission and is used in a relatively low speed expansion bus.

On the other hand, the synchronous transmission system is a system in which data is transmitted by using a common transmission clock signal and can perform a data transmission at a speed higher than that of the asynchronous transmission system.

Figure 7:
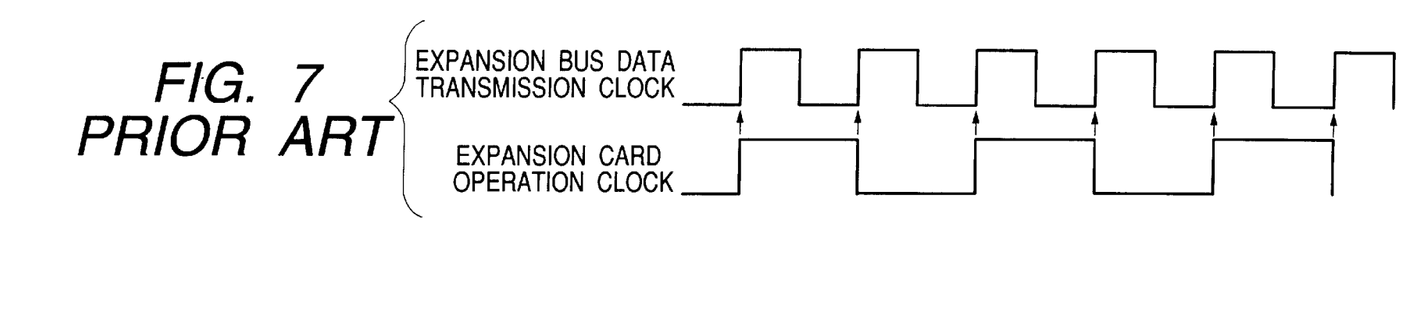
FIG. 7 is a diagram for explaining a conventional technique.
Figure 8:
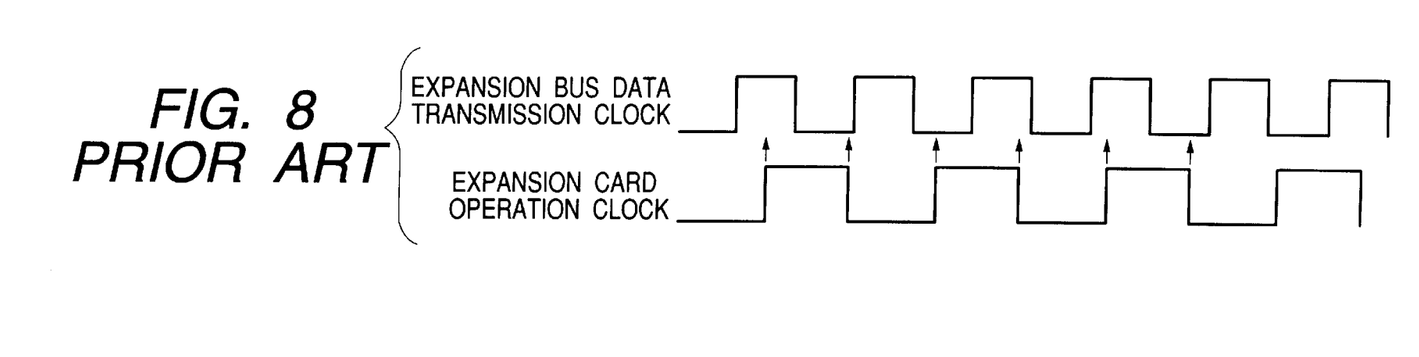
FIG. 8 is a diagram for explaining a conventional technique.

As for the generation of a fundamental operation clock of the expansion card which is connected to the expansion bus of the synchronous transmission system, two kinds of systems are considered. One of them is a system in which the operation clock is generated by using a data transmission clock signal which is supplied from a computer main body via the expansion bus and the whole circuit operates. As shown in a timing chart of FIG. 7, both of the above clocks are synchronized. According to the other system, by providing a substantially independent operation clock generator onto the expansion card, the whole circuit of the card operates asynchronously with the data transmission clock as shown in a timing chart of FIG. 8.

However, in the expansion card in which the whole circuit operates on the basis of the data transmission clock which is supplied from the computer main body, in the case where the expansion bus is an expansion bus such that a frequency of a clock signal can arbitrarily be set in the computer main body as in an expansion bus called, for example, a PCI, an operating speed of the expansion card is influenced by a frequency of the transmission clock of the expansion bus, so that there is a problem that when the frequency of the transmission clock decreases, the performance of the expansion card also deteriorates.

In an expansion card such that the whole circuit operates on the basis of substantially independent clock signals, when a difference between the frequencies and phases of both of the clock signals is absorbed, an overhead occurs and the transmitting speed decreases and there is also a problem in that a FIFO memory is necessary for matching the synchronization or the like and requiring a large-scale matching circuit or the like.

The invention is made to solve the above problems, and it is an object of the invention to provide an expansion card in which by variably setting a frequency of a reference clock in accordance with a fluctuation of a data transmission clock which is supplied through an expansion bus, a data process of high performance can be realized while generating the reference clock of a predetermined frequency without being influenced by a frequency fluctuation of the data transmission clock which is supplied through the expansion bus, and a memory access based on the reference clock of the predetermined frequency which is not influenced by the frequency fluctuation of the data transmission clock which is supplied via the expansion bus can be realized, and to also provide an access control method of the expansion card and a memory medium in which a program that can be read out by a computer has been stored.

SUMMARY OF THE INVENTION

According to an embodiment of the invention, there is provided a device, such as an expansion card, comprising: signal generating means, connected to a predetermined expansion bus, for generating a reference clock synchronized with a data transmission clock which is supplied via the expansion bus; measuring means for measuring a frequency of the data transmission clock; and setting means for setting a frequency of the reference clock which is generated by the signal generating means on the basis of the frequency measured by the measuring means.

DETAILED DESCRIPTION OF THE PREFERRED EMBODIMENT

First Embodiment

Figure 1:
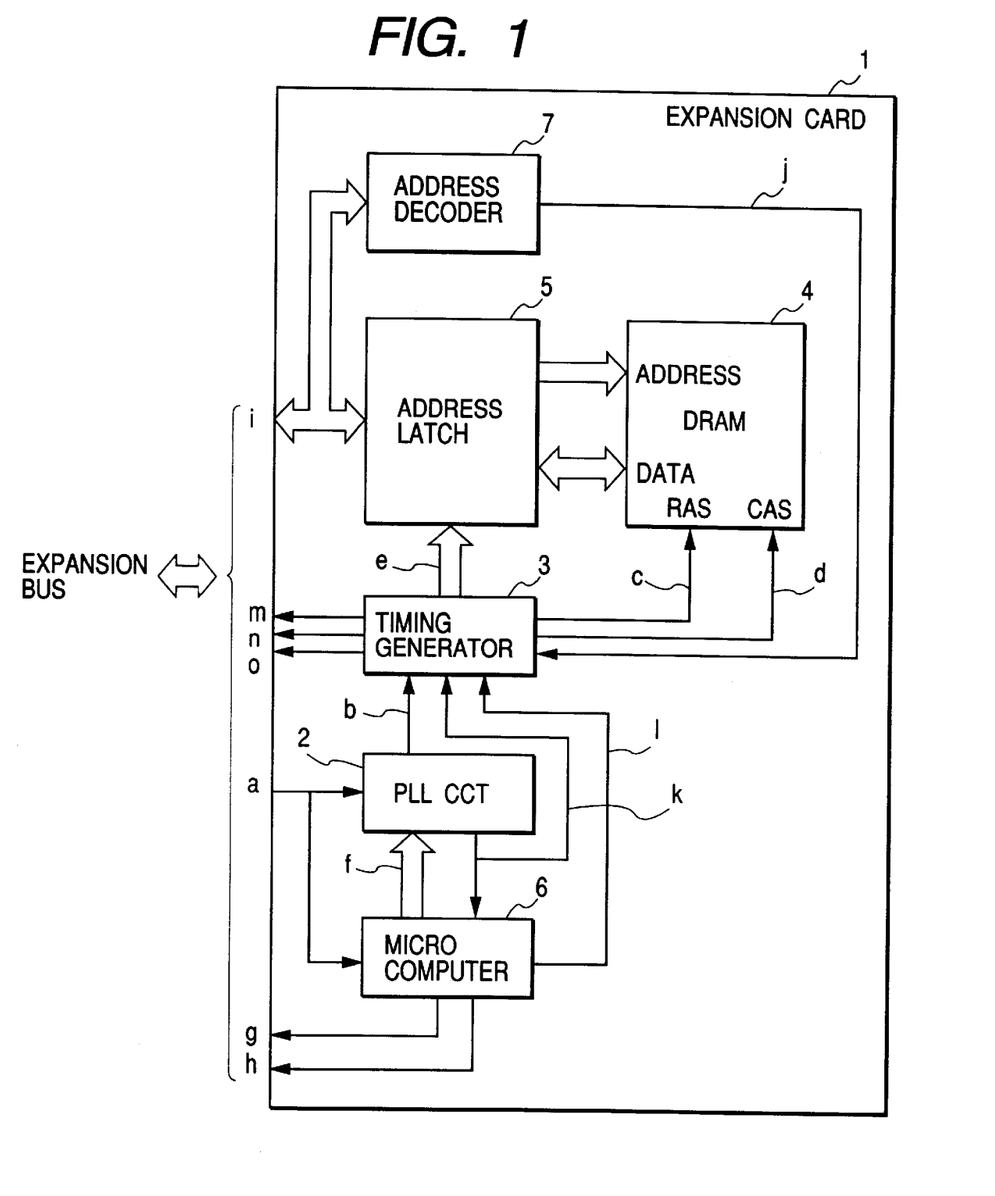
FIG. 1 is a block diagram for explaining a construction of an expansion card showing an embodiment of the invention.

FIG. 1 is a block diagram for explaining a construction of an expansion card showing an embodiment of the invention.

In the diagram, reference numeral 1 denotes an expansion card main body; 2 a PLL circuit for generating a clock signal b of an arbitrary frequency synchronized with an input clock a from an expansion bus; 3 a timing generator for generating an RAS signal c and a CAS signal d serving as access signals to a DRAM (dynamic random access memory) circuit 4, a timing control signal e of an address latch 5, and the like on the basis of the clock signal b that is obtained from the PLL circuit 2.

Reference numeral 6 denotes a one-chip micro-computer having therein a CPU, a RAM, a ROM, a timer circuit, a counter circuit, and the like (not shown). A clock signal a of the expansion bus is inputted to a counter (not shown) built in the micro-computer 6. A count value of the clock signal a can be obtained.

A control signal f from the micro-computer 6 is connected to the PLL circuit 2. The setting of a frequency division ratio of a frequency divider in the PLL circuit 2 and the like can be controlled. Further, an interruption signal g and a waiting signal h can be outputted from the micro-computer 6 to the expansion bus.

Reference numeral 4 denotes the DRAM (dynamic random access memory) circuit comprising a plurality of RAM chips. Reference numeral 5 denotes the address latch for latching an address/data signal i from the expansion bus, supplying to the DRAM circuit 4, and functioning as a buffer circuit of a data signal of the expansion bus and the DRAM circuit 4.

Reference numeral 7 denotes an address decoder for detecting an access to the DRAM circuit 4 by the address/data signal i or the like of the expansion bus and supplying a detection result as an access signal j to the timing generator 3.

Figure 2:
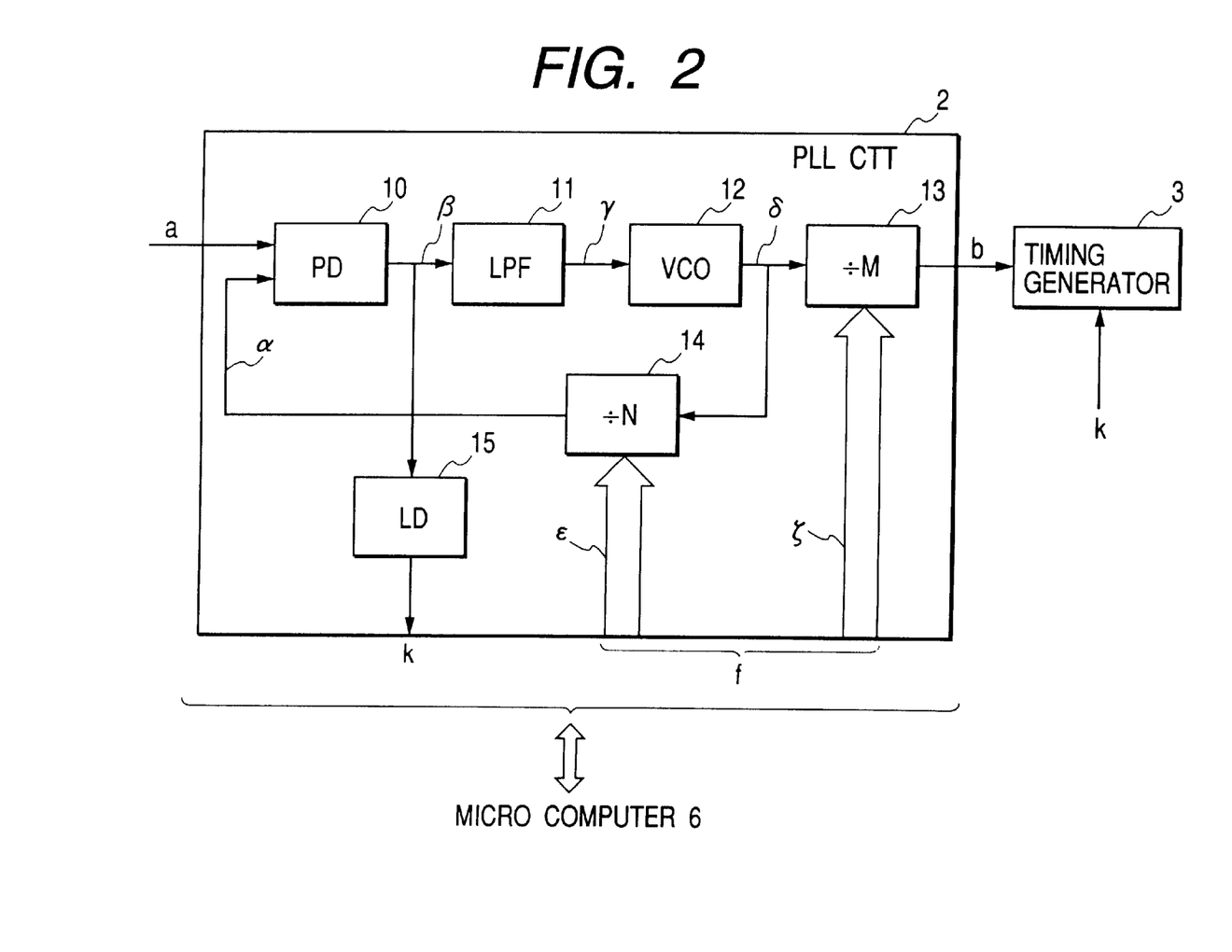
FIG. 2 is a block diagram for explaining a detailed construction of a PLL circuit shown in FIG. 1.

FIG. 2 is a block diagram for explaining a detailed construction of the PLL circuit 2 shown in FIG. 1, and the same component elements as those in FIG. 1 are designated by the same reference numerals.

In the diagram, reference numeral 10 denotes a phase detector (PD); 11 a low pass filter (LPF); 12 a voltage controlled oscillator (VCO); 13 and 14 frequency dividers; and 15 a lock detector (LD) for generating a locking signal k of the PLL circuit 2 on the basis of an output $\beta 0$ of the phase detector 10.

The operation of the PLL circuit 2 in FIG. 2 will now be described hereinbelow.

An input clock, namely, a phase of the data transmission clock a from the expansion bus is compared with a phase of an output $\alpha 0$ a of the frequency divider 14 by the phase detector 10, so that the phase difference signal $\beta 0$ is generated. The phase difference signal $\beta 0$ is converted into a voltage signal y according to the phase difference by the low pass filter 11. The voltage signal $\gamma 0$ is inputted to the voltage controlled oscillator 12.

An oscillation output (output clock $\delta$) of the VCO 12 is inputted to the frequency divider 14. By this feedback loop, the phase of the input clock a and the phase of the output $\alpha 0$ of the frequency divider 14, namely, the output clock $\delta 0$ of the VCO 12 are held so that their phases are always synchronized.

The output clock $\delta 0$ of the VCO 12 is inputted to the frequency divider 13. Now, assuming that a frequency of the output clock b is labeled as Fout, the relation between the frequency Fout and a frequency Fin of the input clock a is (Fout=N÷M×Fin) and the phases are always held in the synchronous state when it is assumed that a frequency division ratio of the frequency divider 13 is set to "M" and that of the frequency divider 14 is set to "N".

Further, the frequency division ratios of the frequency dividers 13 and 14 can be set from the outside by using signals $\epsilon 0$ and $\xi$, namely, the control signal f from the micro-computer 6.

A characteristic construction of the embodiment will now be described hereinbelow with reference to FIGS. 1 and 2 and the like.

Figure 4:
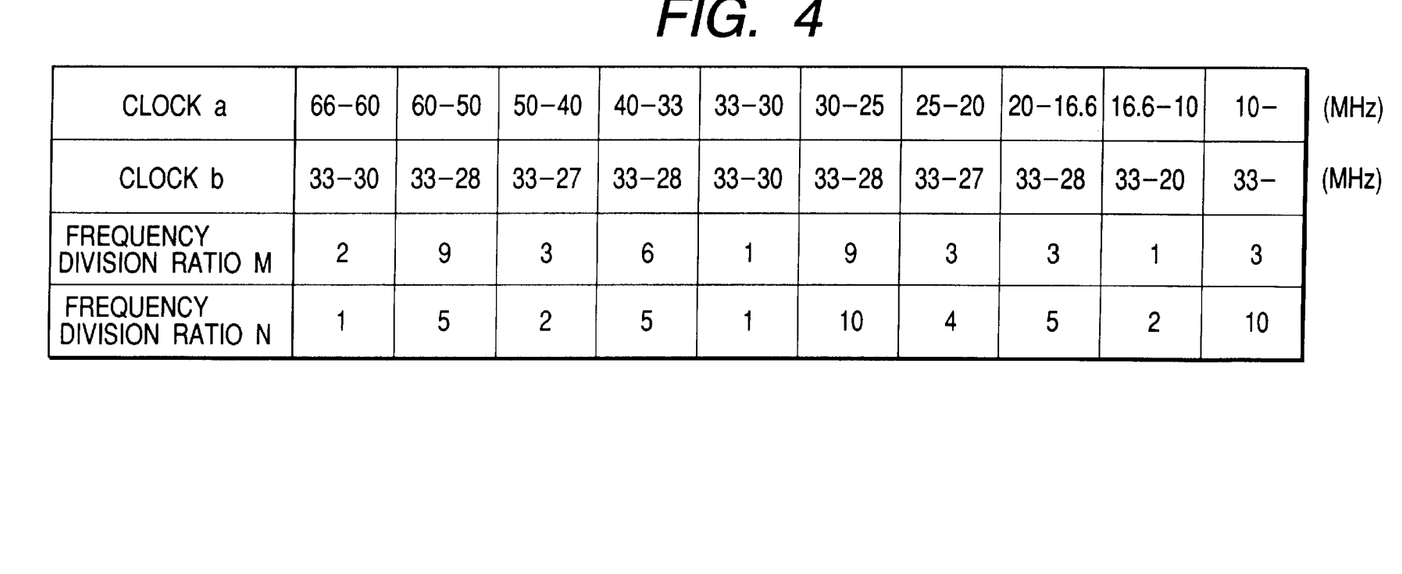
FIG. 4 is a diagram showing the relation between a frequency division ratio which is set into each frequency divider shown in FIG. 2 and each clock.

The expansion card constructed as mentioned above has: signal generating means (PLL circuit 2), connected to a predetermined expansion bus, for generating the reference clock (output clock b) synchronized with the data transmission clock by frequency dividing the data transmission clock a which is supplied through the expansion bus; measuring means (by an internal timer of the micro-computer 6) for measuring the frequency of the data transmission clock; and setting means for setting the frequency of the reference clock which is generated by the signal generating means on the basis of the frequency measured by the measuring means (it is set by the control signal f to set the frequency division ratios for the frequency dividers 13 and 14 on the basis of a table that is stored in the ROM in the micro computer 6 or another memory resource and is shown in FIG. 4, which will be explained hereinlater), wherein a data process of high performance can be performed while generating the reference clock of a predetermined frequency without being influenced by a frequency fluctuation of the data transmission clock which is supplied via the expansion bus.

Since the expansion card has the timing signal generating means (timing generator 3) for generating an access timing signal to a predetermined memory (DRAM circuit 4 or another memory resource can be also used) on the basis of the output clock b, a memory access based on the reference clock of a predetermined frequency which is not influenced by the frequency fluctuation of the data transmission clock which is supplied via the expansion bus can be realized.

The operation of each section will now be described in detail hereinbelow with reference to FIGS. 3 and 4.

Figure 3:
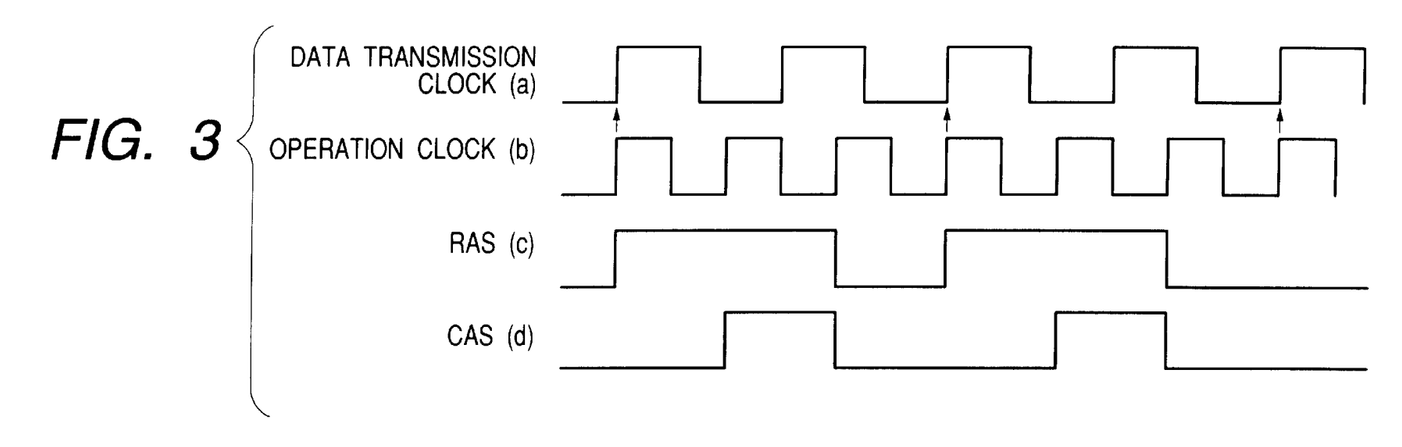
FIG. 3 is a timing chart showing a timing of a memory access control signal of the expansion card shown in FIG. 1.

FIG. 3 is a timing chart showing a timing of the memory access control signal of the expansion card shown in FIG. 1. FIG. 4 is a diagram showing the relation between the frequency division ratios which are set into the frequency dividers 13 and 14 shown in FIG. 2 and each clock.

The input clock a from the expansion bus is inputted to the micro-computer 6. The micro-computer 6 supplies the input clock a to the internal counter circuit (not shown) and calculates a frequency of the input clock a from the count value for a predetermined time and sets the calculation value to the frequency Fin.

As a timing signal for accessing, the RAS signal c and CAS signal d are inputted from the timing generator 3 to the DRAM circuit 4 at timings shown in FIG. 3.

For example, now assuming that when the frequency of the output clock b of the DRAM circuit 4 is equal to 33 MHz, an accessing time of the DRAM circuit 4 is set to the highest speed. To form the highest speed timing of the DRAM circuit 4 from the input clock a, the micro-computer 6 sets the control signal f by the PLL circuit 2 so that the frequency of the output clock b is equal to 33 MHz.

Specifically speaking, as shown in FIG. 4, the frequency division ratio of the frequency divider 13 is set to M and that of the frequency divider 14 is set to N. For example, when the frequency of the input clock a lies within a range from 66 MHz to 60 MHz, by respectively setting the frequency division ratios M and N to "2" and "1", the signal of 33 MHz or 30 MHz is derived as an output clock b. When the frequency of the input clock a lies within a range from 60 MHz to 50 MHz, by respectively setting the frequency division ratios M and N to "9" and "5", the signal of 33 MHz or 28 MHz is derived as an output clock b.

When the frequency division ratios are set, the frequencies can be also further finely set.

The micro-computer 6 waits until the PLL circuit 2 is locked. A state where the PLL circuit 2 is locked denotes a state where the input clock a and output clock b are perfectly synchronized and, as shown in FIG. 3, leading edges of those signals simultaneously appear.

In FIG. 2, the locking signal k is formed by the lock detector 15 by the phase difference signal β of the phase detector 10 of the PLL circuit 2. The locking signal k is connected to an input port of the micro-computer 6. The micro-computer 6 monitors the locking signal k. When it detects that the locking state continues for a predetermined time, the micro-computer 6 determines that it is possible to access to the DRAM circuit 4, and outputs an access ready signal l to the timing generator 3.

The operation of the timing generator 3 is as follows.

In case of a state where the PLL circuit 2 is not locked, namely, when the DRAM circuit 4 cannot be accessed, the access ready signal l from the micro-computer 6 is "inactive". In this case, the address decoder 7 detects the access from the expansion bus. When the access signal j is made active, the timing generator 3 makes an access retry signal m active for the expansion bus and requests the expansion bus side to again access. Or, the timing generator 3 can also make an abort signal n active. It is also possible to allow the expansion bus to wait by making a waiting signal o active as necessary.

In case of a state where the PLL circuit 2 is locked, namely, a state where it is possible to access to the DRAM circuit 4, the access ready signal l from the micro-computer 6 is "active". Therefore, if the access signal j showing the access from the expansion bus which is derived from the address decoder 7 is "active", timing signals to the address latch 5 and DRAM circuit 4 are generated and the normal accessing operation is executed.

The operation in the case where the frequency of the data transmission clock signal a of the expansion bus suddenly changes will now be described.

When the frequency Fin of the clock signal a suddenly changes, the synchronization of the PLL circuit 2 is released. Thus, the locking signal k is made "inactive" and the micro-computer 6 detects the pull-out state. When such a pull-out state is detected, the micro-computer 6 again starts the process to measure the frequency of the transmission clock, namely, the input clock a and controls the PLL circuit 2 so that the output clock b is set to the optimum frequency.

Since the locking signal k is also inputted to the timing generator 3, the apparatus can be immediately set into the access "impossible" state for the access from the expansion bus. Thus, illegal access due to the delay of the processing by the micro-computer can be prevented.

The subsequent operation is the same as that when a power source is turned on. When the input clock a and the output clock b are synchronized and the locking signal k is set to the "active" state for a predetermined time, the access ready signal l is set to the "active" state and the apparatus enters the normal operating state.

The operation in the case where the synchronization is released due to an accidental factor such as noises or the like is also similar to that in the case where the frequency of the input clock signal suddenly changes.

Further, in the case where the PLL circuit is not locked for a predetermined time, such a state is regarded as a hardware error and the interruption signal g to the expansion bus is made active, and the error can be also notified to a computer (not shown).

An access control method of an expansion card according to the invention will now be described hereinbelow with reference to a flowchart shown in FIG. 5.

Figure 5:
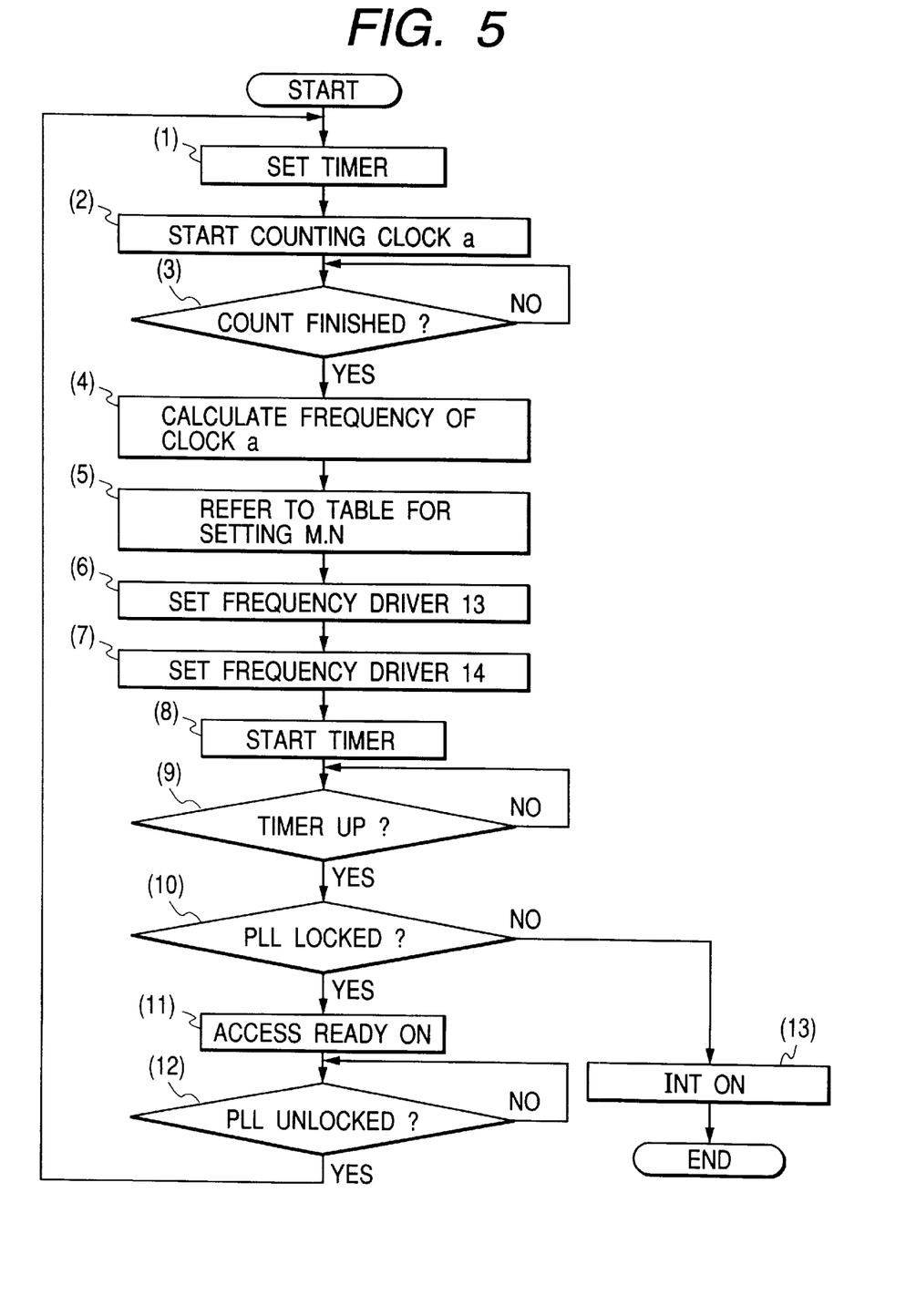
FIG. 5 is a flowchart showing an example of an access control procedure of the expansion card according to the invention.

FIG. 5 is a flowchart showing an example of an access control procedure of the expansion card according to the invention and corresponds to the data processing procedure by the micro-computer 6 shown in FIG. 1. Reference numerals (1) to (13) denote processing steps, respectively.

First, the micro computer 6 sets a predetermined time into the internal timer (1), inputs the input clock a into the internal counter circuit (not shown) and allows the counting operation to be started (2), and calculates the frequency of the input clock a from the count value (4) when the counting operation for the predetermined time is finished (3).

Subsequently, with reference to the table for setting the frequency division ratios M and N which is stored in the ROM or the like in the micro-computer 6 and is shown in, for example, FIG. 4 (5), the values corresponding to the frequency dividers 13 and 14 are set by the control signal f (6) and (7). The internal timer to count a predetermined time is started (8). When the timer finishes the counting operation of the predetermined time (9), a check is made to see if the PLL circuit 2 has been locked (10). If NO, for instance, an interruption to make the interruption signal g active is set into the active state (13). This state is notified to the host CPU and the processing routine is finished.

When it is decided in step (10) that the PLL circuit 2 has been locked, the access ready signal l is made "active", thereby setting into the access ready state to the DRAM circuit 4 (11) and allowing the memory access to the DRAM circuit 4 to be started.

Subsequently, a check is made to see if the locking state of the PLL circuit 2 has been unlocked (12). When it is unlocked, namely, if it is YES, the processing routine is returned to step (1) and the same processes are repeated.

Second Embodiment

Although the first embodiment has been described with respect to the case of using the control signal f of the micro-computer 6 in order to set the frequency division ratios M and N of the frequency dividers 13 and 14 of the PLL circuit 2, the above procedure is not limited to the micro-computer 6 but can be also constructed with hardware logic.

Further, the memory circuit which is installed in the expansion card is not limited to the DRAM circuit 4 but an SRAM circuit or a logic circuit of an image processing circuit or the like other than a memory can be also used.

A construction of a data processing program which can be read out by the expansion card regarding the invention will now be described hereinbelow with reference to a memory map shown in FIG. 6.

Figure 6:
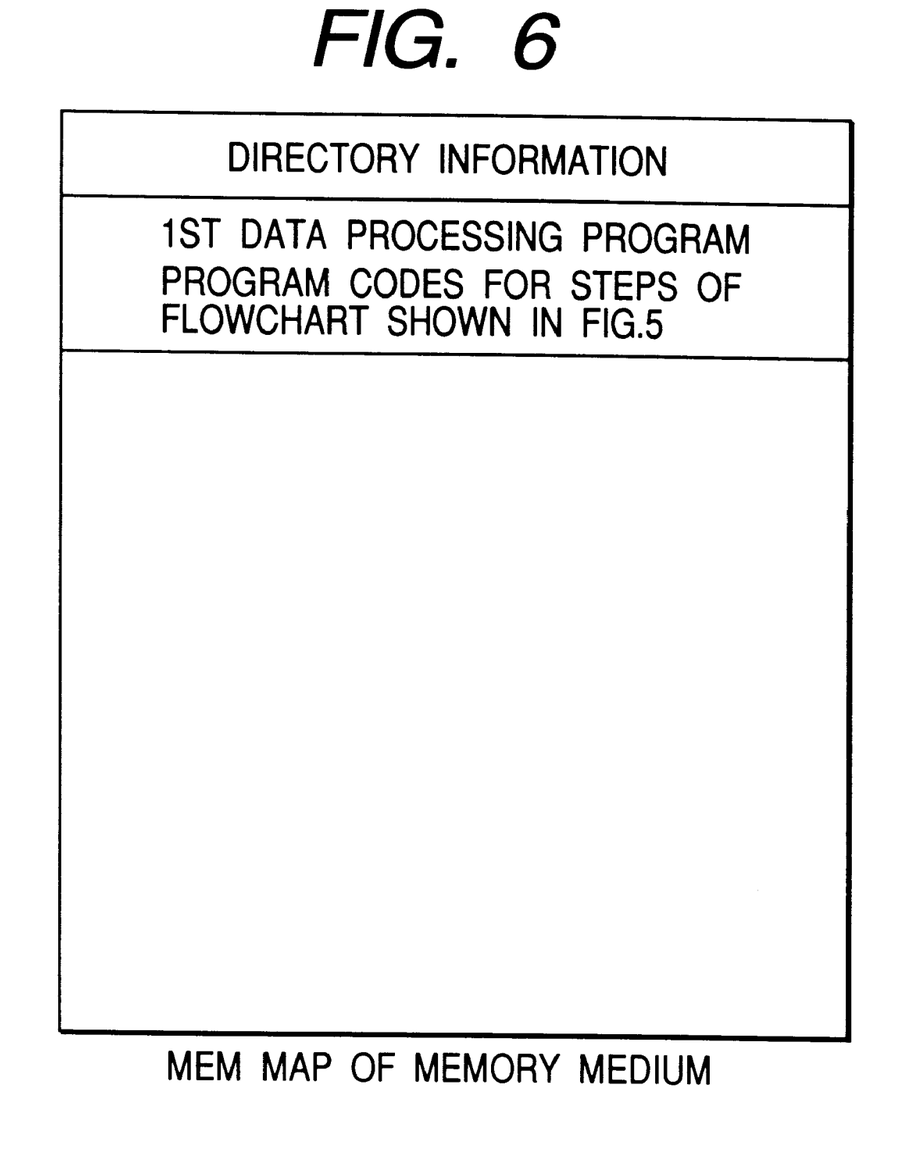
FIG. 6 is a diagram for explaining a memory map of a memory medium to store various data processing programs which can be read out by the expansion card according to the invention.

FIG. 6 is a diagram for explaining a memory map of a memory medium to store various data processing programs which can be read out by the expansion card according to the invention.

Although not shown in particular, information to manage the programs which are stored to the memory medium, for example, version information, persons who make them, and the like are also stored. There is also a case where information which depends on the OS or the like on the program reading side, for instance, icons to identify and display the programs and the like are stored.

Further, data belonging to various programs is also managed in the directory. There is also a case where a program to install various programs into the computer and, in the case where the program to install has been compressed, a program to decode the program, and the like are also stored.

The function shown in FIG. 5 in is embodiment can be also executed by a host computer by the program which is installed from the outside. In such a case, the invention is applied even in the case where an information group including the program is supplied to an output apparatus from a memory medium such as a CD-ROM, flash memory, FD, or the like or from an external memory medium through a network.

As mentioned above, it will be apparent that the object of the invention is accomplished by a method whereby a memory medium in which program codes of software to realize the function of the embodiment mentioned above have been recorded is supplied to a system or an apparatus and a computer (or CPU or MPU) of the system or apparatus reads out and executes the program codes stored in the memory medium.

In this case, the program codes themselves read out from the memory medium realize the novel function of the invention and the memory medium in which the program codes have been stored accomplishes the invention.

As a memory medium to supply the program codes, it is possible to use, for example, any one of a floppy disk, a hard disk, an optical disk, a magnetooptic disk, a CD-ROM, a CD-R, a magnetic tape, a non-volatile memory card, a ROM, an EEPROM, and the like.

It will be also obviously understood that not only the function of the embodiment mentioned above is realized by executing the read-out program codes by the computer but also the OS (operating system) or the like which runs on the computer executes a part or all of the actual processes on the basis of an instruction of the program codes and the function of the embodiment mentioned above is realized by those processes.

Further, it will be also obviously understood that after the program codes read out from the memory medium have been written into the memory equipped in a function expansion board inserted in a computer or a function expansion unit connected to the computer, on the basis of an instruction of the program codes, a CPU provided for the function expansion board or the function expansion unit or the like executes a part or all of the actual processes and the function of the embodiment mentioned above is realized by those processes.

According to the invention as described above, since the expansion card has: the signal generating means, connected to a predetermined expansion bus, for generating the reference clock synchronized with the data transmission clock which is supplied through the expansion bus; the measuring means for measuring the frequency of the data transmission clock; and the setting means for setting the frequency of the reference clock which is generated by the signal generating means on the basis of the frequency measured by the measuring means. Therefore, a data process of high performance can be realized while generating the reference clock of a predetermined frequency without being influenced by the frequency fluctuation of the data transmission clock which is supplied via the expansion bus.

Since the expansion card also has the timing signal generating means for generating the access timing signal for a predetermined memory on the basis of the reference clock, a memory access based on the reference clock of a predetermined frequency which is not influenced by the frequency fluctuation of the data transmission clock which is supplied through the expansion bus can be realized.

There is also provided the access control method of an expansion card having the signal generating means, connected to a predetermined expansion bus, for generating the reference clock synchronized with the data transmission clock which is supplied through the expansion bus. There is further provided the memory medium in which a program which can be read out by a computer and controls the access of the expansion card having the signal generating means, connected to a predetermined expansion bus, for generating the reference clock synchronized with the data transmission clock which is supplied through the expansion bus has been stored, wherein the program has: the measuring step of measuring the frequency of the data transmission clock; and the setting step of setting the frequency of the reference clock which is generated by the signal generating means on the basis of the measured frequency. Therefore, a data process of high performance can be realized while generating the reference clock of the predetermined frequency without being influenced by the frequency fluctuation of the data transmission clock which is supplied through the expansion bus.

What is claimed is:

1. An expansion device connected to an expansion bus comprising:
   clock receiving means for receiving a data transmission clock supplied through the expansion bus;
   clock generating means for generating a reference clock;
   first frequency dividing means for dividing the reference clock with a first frequency division ratio;
   control means for controlling said clock generating means so that an output of said first frequency dividing means synchronizes with the data transmission clock;
   second frequency dividing means for generating an operation clock of the expansion device by dividing the reference clock with a second frequency division ratio; and
   setting means for setting arbitrary numbers as the first and second frequency division ratios to said first and second frequency dividing means, respectively.

2. A device according to claim 1, further comprising timing signal generating means for generating an access timing signal for a predetermined memory on the basis of the operation clock.

3. A device according to claim 1, further comprising measuring means for measuring a frequency of the data transmission clock, and
   wherein said setting means sets the first and second frequency division ratios on the basis of the frequency measured by said measuring means.

4. A device according to claim 3, wherein said setting means sets the first and second frequency division ratios so that a ratio of the first and second frequency division ratios matches a ratio of a desired frequency of the operation clock and the measured frequency of data transmission clock.

5. A control method for use with an expansion device connected to an expansion bus, having a clock generator for generating a reference clock, comprising:
   a receiving step, of receiving a data transmission clock supplied through the expansion bus;
   a generating step, of generating a reference clock by means of the clock generator;
   a first dividing step, of dividing the reference clock with a first frequency division ratio;
   a control step, of controlling the clock generator so that a divided clock divided in said first dividing step synchronizes with the data transmission clock;

a second dividing step, of generating an operation clock of the expansion device by dividing the reference clock with a first frequency division ratio; and a setting step, of setting arbitrary numbers as the first and second frequency division ratios.

6. A method according to claim 5, further comprising a measuring step, of measuring a frequency of the data transmission clock, and wherein, in said setting step, the first and second frequency division ratios are set on the basis of the measured frequency.

7. A method according to claim 6, wherein, in said setting step, the first and second frequency division ratios are set so that a ratio of the first and second frequency division ratios matches a ratio of a desired frequency of the operation clock and the measured frequency of data clock.

8. An expansion device connected to an expansion bus, comprising:

a clock receiver, that receives a data transmission clock supplied through the expansion bus;

a clock generator whose output is a reference clock;

a first frequency divider, arranged to receive the reference clock, and outputting a first frequency-divided signal obtained by dividing the reference clock with a first frequency division ratio;

a controller that controls said clock generator so that an output of said first frequency divider synchronizes with the data transmission clock;

a second frequency divider, arranged to receive the reference clock, and outputting an operation clock of the expansion device by dividing the reference clock with a second frequency division ratio; and a setting means for setting arbitrary numbers as the first and second frequency division ratios to said first and second frequency dividers, respectively.

* * * * *